US00RE49894E

(19) United States
(12) Reissued Patent
Couture et al.

(10) Patent Number: US RE49,894 E
(45) Date of Reissued Patent: Apr. 2, 2024

(54) CRUSH-TOLERANT CONTAINER AND BLANK AND METHOD FOR FORMING THE SAME

(71) Applicant: WestRock Shared Services, LLC, Atlanta, GA (US)

(72) Inventors: David G. Couture, Hoschton, GA (US); Timothy L. McCarthy, Wilmette, IL (US); Victoria Bernstein, Atlanta, GA (US)

(73) Assignee: WestRock Shared Services, LLC, Atlanta, GA (US)

(21) Appl. No.: 17/675,981

(22) Filed: Feb. 18, 2022

Related U.S. Patent Documents

Reissue of:
(64) Patent No.: 10,882,657
Issued: Jan. 5, 2021
Appl. No.: 15/428,770
Filed: Feb. 9, 2017

(51) Int. Cl.

| | |
|---|---|
| ***B65D 5/44*** | (2006.01) |
| ***B31B 50/26*** | (2017.01) |
| ***B65D 5/00*** | (2006.01) |
| ***B65D 5/02*** | (2006.01) |
| ***B65D 5/42*** | (2006.01) |
| *B31B 50/62* | (2017.01) |
| *B31B 50/81* | (2017.01) |
| *B31B 100/00* | (2017.01) |
| *B31B 120/00* | (2017.01) |

(52) U.S. Cl.
CPC ..... *B65D 5/443* (2013.01); *B65D 5/001* (2013.01); *B65D 5/02* (2013.01); *B65D 5/4266* (2013.01); *B31B 50/26* (2017.08); *B31B 50/62* (2017.08); *B31B 50/81* (2017.08); *B31B 2100/00* (2017.08); *B31B 2120/502* (2017.08)

(58) Field of Classification Search
CPC ..... B65D 5/443; B65D 5/001; B65D 5/005; B65D 5/02; B65D 5/4266; B31B 50/26; B31B 50/624; B31B 50/262; B31B 50/62; B31B 2100/00; B31B 2120/502
See application file for complete search history.

(56) References Cited

U.S. PATENT DOCUMENTS 1,329,531 A * 2/1920 Kitt ..... B65D 5/48024 229/120.02
2,721,689 A * 10/1955 Nye ..... B65D 5/001 206/509
3,899,123 A * 8/1975 Stollberg ..... B65D 5/36 229/117.08

(Continued)

*Primary Examiner* — Patricia L Engle
(74) *Attorney, Agent, or Firm* — Neil G. Cohen; Rohini K. Garg

(57) ABSTRACT

A blank for constructing a crush-tolerant container includes a first side panel, a bottom panel, a second side panel, and a top panel coupled together in series. At least one cutout and at least one bridge portion are defined along a first fold line between the top panel and the first side panel. The at least one bridge portion and the at least one cutout are configured to maintain the top panel in a plane spaced above a top edge of the first side panel when the container is formed and the top panel is not under a stacking load, and to allow the top panel to move downwardly such that at least a portion of the top panel is substantially co-planar with the top edge of the first side panel when the container is formed and the top panel is under the stacking load.

46 Claims, 6 Drawing Sheets

(56) References Cited

U.S. PATENT DOCUMENTS

| | | | | |
|---|---|---|---|---|
| 5,860,590 | A * | 1/1999 | Blomfield | B65D 5/443 229/165 |
| 7,780,067 | B2 * | 8/2010 | Holley, Jr. | B65D 5/4608 229/117.12 |
| 8,851,362 | B2 * | 10/2014 | Aksan | B65D 5/4266 229/198.2 |
| 2006/0278689 | A1 * | 12/2006 | Boshinski | B65D 5/0227 229/117.16 |
| 2011/0036904 | A1 * | 2/2011 | Lopez Masague | B65D 5/003 229/126 |
| 2011/0174655 | A1 * | 7/2011 | Gonn | B65D 5/48018 206/503 |
| 2014/0021082 | A1 * | 1/2014 | Holley, Jr. | B65B 21/242 206/427 |
| 2014/0374303 | A1 * | 12/2014 | Martinez | B65D 5/003 206/508 |
| 2018/0297745 | A1 * | 10/2018 | Borek | B65D 5/4266 |

* cited by examiner

CRUSH-TOLERANT CONTAINER AND BLANK AND METHOD FOR FORMING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

REFERENCE TO RELATED APPLICATION

This *application is a Reissue of U.S. patent application Ser. No. 10,882,657, which issued on Jan. 5, 2021, from U.S. patent application Ser. No. 15/428,770, filed Feb. 9, 2017, which* application claims the benefit of priority under 35 U.S.C. § 119(e) of U.S. provisional application Ser. No. 62/293,856 filed on Feb. 11, 2016, *each of* which is hereby incorporated by reference in its entirety.

BACKGROUND

This disclosure relates generally to containers formed from blanks of sheet material, and, more specifically, to a blank of sheet material for forming a crush-tolerant container, and methods for forming the container.

Corrugated board containers are often used to hold products therein, and are frequently stacked during shipping and storage of those products. At least some known containers are configured such that the side walls must hold the weight of the containers(s) stacked thereupon. If the weight on the bottommost container(s) increases to the point that the sidewalls fail (i.e., collapse inwards or outwards relative to the interior of the container), and the products inside may be damaged or crushed. At least some known containers are manufactured to include double- or triple-ply walls to increase the stacking strength thereof, but such an approach necessitates the use of more blank material, which increases the cost of the container.

BRIEF DESCRIPTION

In one aspect, a blank for constructing a crush-tolerant container is provided. The blank includes a plurality of panels coupled together in series along substantially parallel fold lines, the plurality of panels including a first side panel, a bottom panel, a second side panel, and a top panel. The blank also includes at least one cutout and at least one bridge portion positioned along a first fold line between the top panel and the first side panel. The at least one bridge portion is configured to maintain the top panel in a plane spaced above a top edge of the first side panel when the container is formed and the top panel is not under a stacking load. The at least one bridge portion and the at least one cutout are configured to allow the top panel to move downwardly such that at least a portion of the top panel is substantially co-planar with the top edge of the first side panel when the container is formed and the top panel is under the stacking load.

In another aspect, a crush-tolerant container formed from a blank of sheet material is provided. The container includes a top wall, an opposing bottom wall, and two opposing side walls. The top wall, the two side walls, and the bottom wall define a cavity. The container further includes a first compression zone defined between the top wall and a first side wall of the two side walls. The first compression zone includes a first cutout and at least a first bridge portion. The first compression zone maintains the top wall in a first plane separated from a top edge of the first side wall by a compression depth when the top wall is not under a stacking load, and the first compression zone is configured to enable displacement of the top wall toward the cavity by the compression depth when the top wall is under the stacking load.

In yet another aspect, a method for forming a crush-tolerant container from a blank of sheet material is provided. The blank includes a plurality of panels coupled together in a series along substantially parallel fold lines. The plurality of panels includes a top panel, a first side panel, a bottom panel, a second side panel, and a glue flap. The blank further includes at least one cutout and at least one bridge portion positioned along a first fold line between the top panel and the first side panel. The method includes rotating the plurality of panels about the plurality of fold lines to form a plurality of walls of the container, such that the plurality of walls define a cavity, and such that the at least one bridge portion extends between a first side wall and a top wall of the plurality of walls. The method also includes securing the glue flap to the top panel. The at least one bridge portion maintains the top wall in a plane spaced above a top edge of the first side wall by a compression depth when the top wall is not under a stacking load. The at least one bridge portion and the at least one cutout are configured to allow the top wall to move downwardly such that at least a portion of the top panel is substantially co-planar with the top edge of the first side panel when the top wall is under the stacking load.

An assembly of stacked crush-tolerant containers is provided, the assembly including a first crush-tolerant container and a second crush-tolerant container stacked vertically on top of the first container. The first container includes a top wall, an opposing bottom wall, and two opposing side walls. The top wall, the two side walls, and the bottom wall define a cavity. The first container also includes a first compression zone defined between the top wall and a first side wall of the two side walls, the first compression zone including a first cutout and at least a first bridge portion. Under a load of the second container, the first compression zone enables displacement of the top wall toward the cavity of the first container by a compression depth.

DETAILED DESCRIPTION

The following detailed description illustrates the disclosure by way of example and not by way of limitation. The description clearly enables one skilled in the art to make and use the disclosure, describes several embodiments, adaptations, variations, alternatives, and use of the disclosure, including what is presently believed to be the best mode of carrying out the disclosure.

The embodiments described herein provide a stackable, crush-tolerant container formed from a single sheet of blank material, and a method for constructing the container. The container may be constructed from a blank of sheet material using a machine and/or by hand. In one embodiment, the blank is fabricated from a corrugated cardboard material. The blank, however, may be fabricated using any suitable material, and therefore is not limited to a specific type of material. In alternative embodiments, the blank is fabricated using cardboard, plastic, fiberboard, paperboard, foamboard, corrugated paper, and/or any suitable material known to those skilled in the art and guided by the teachings herein provided.

In an example embodiment, the blank includes at least one marking thereon including, without limitation, indicia that communicates the product, a manufacturer of the product and/or a seller of the product. For example, the marking may include printed text that indicates a product's name and briefly describes the product, logos and/or trademarks that indicate a manufacturer and/or seller of the product, and/or designs and/or ornamentation that attract attention. "Printing," "printed," and/or any other form of "print" as used herein may include, but is not limited to including, ink jet printing, laser printing, screen printing, giclée, pen and ink, painting, offset lithography, flexography, relief print, rotogravure, dye transfer, and/or any suitable printing technique known to those skilled in the art and guided by the teachings herein provided. In another embodiment, the blank is void of markings, such as, without limitation, indicia that communicates the product, a manufacturer of the product and/or a seller of the product.

Figure 1:
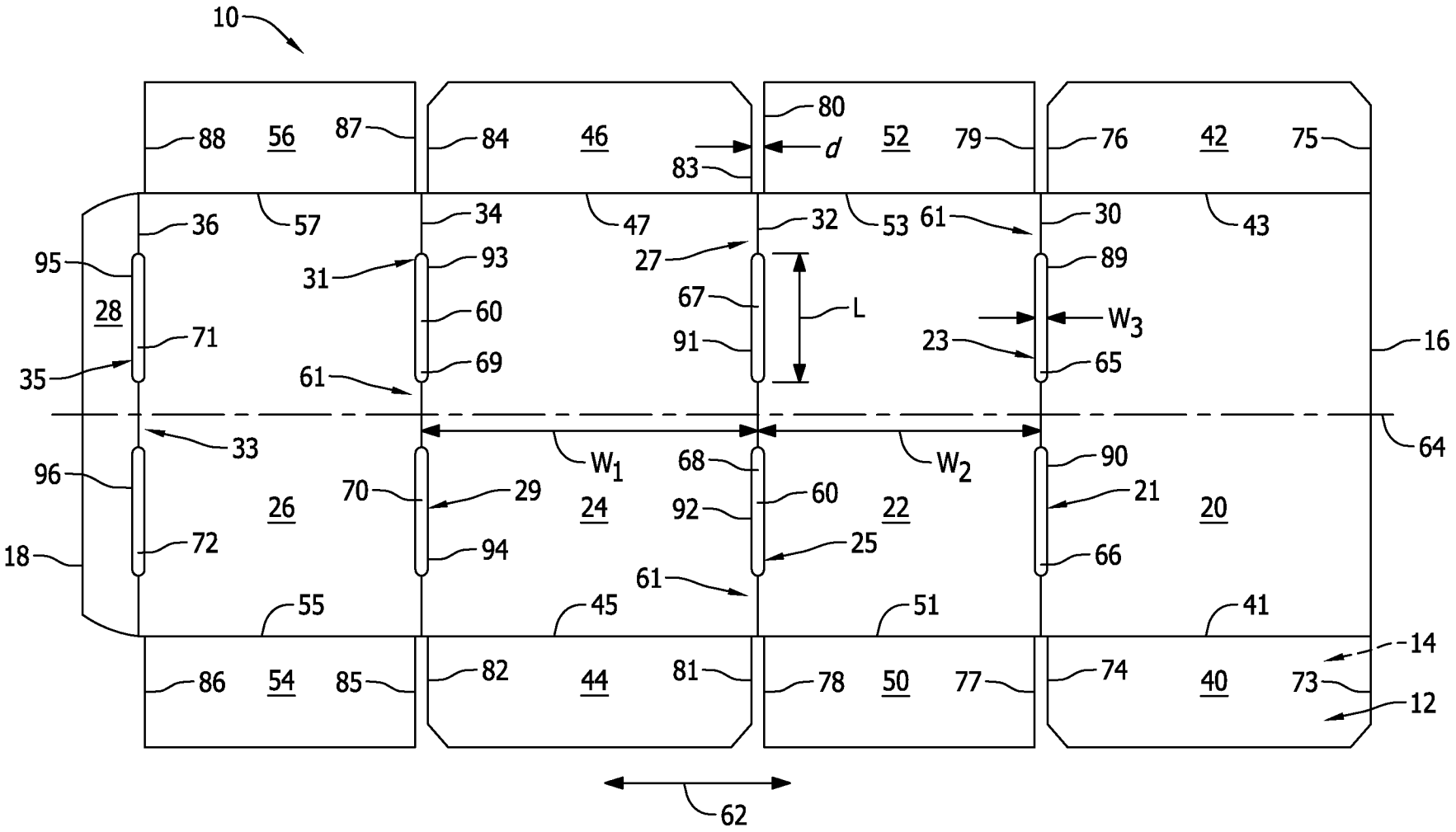
FIG. 1 is a top plan view of an interior surface of an example embodiment of a blank of sheet material.
Figure 2:
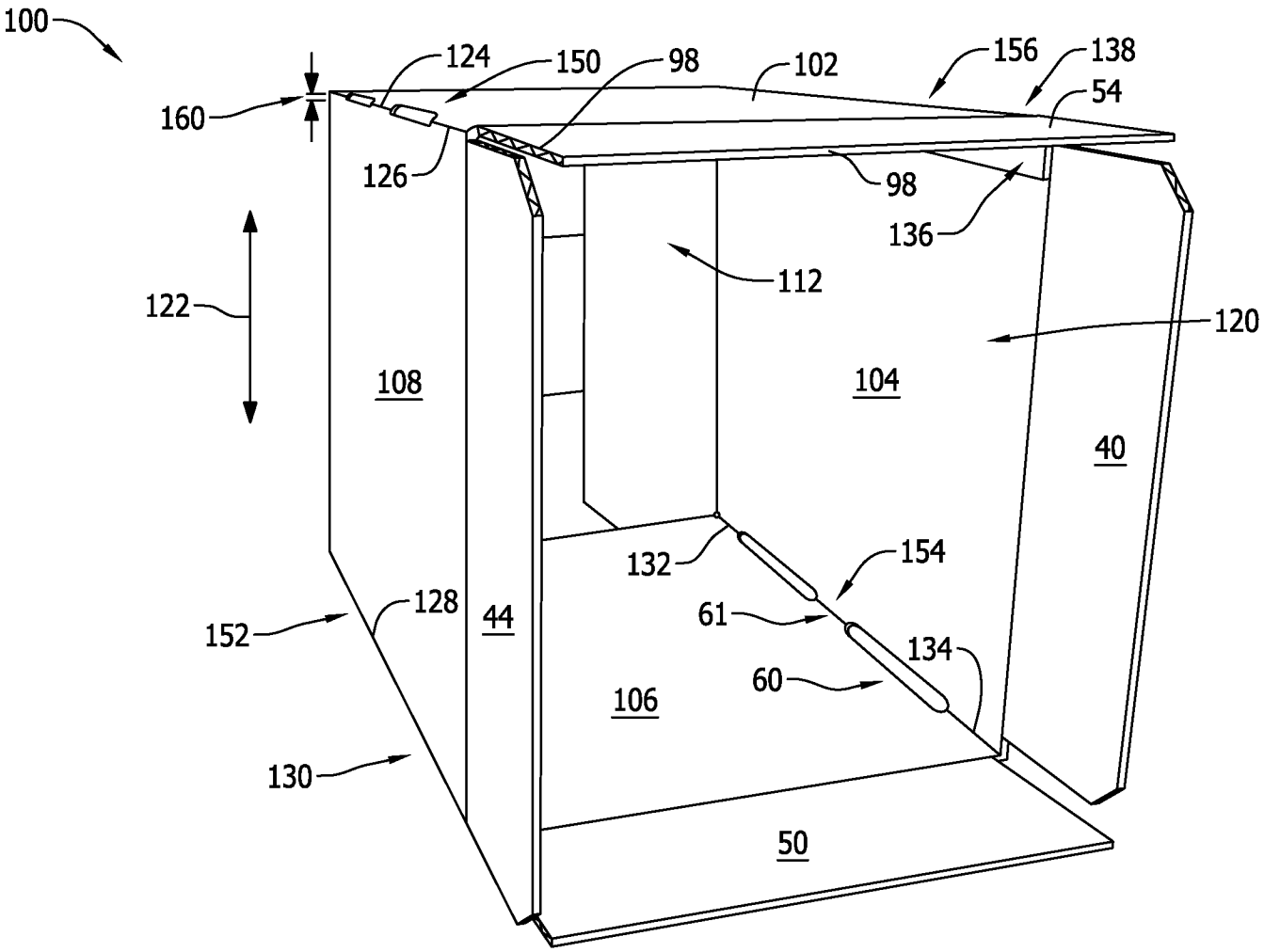
FIG. 2 is a perspective view of an example embodiment of a partially formed container, formed from the blank of FIG. 1.
Figure 3:
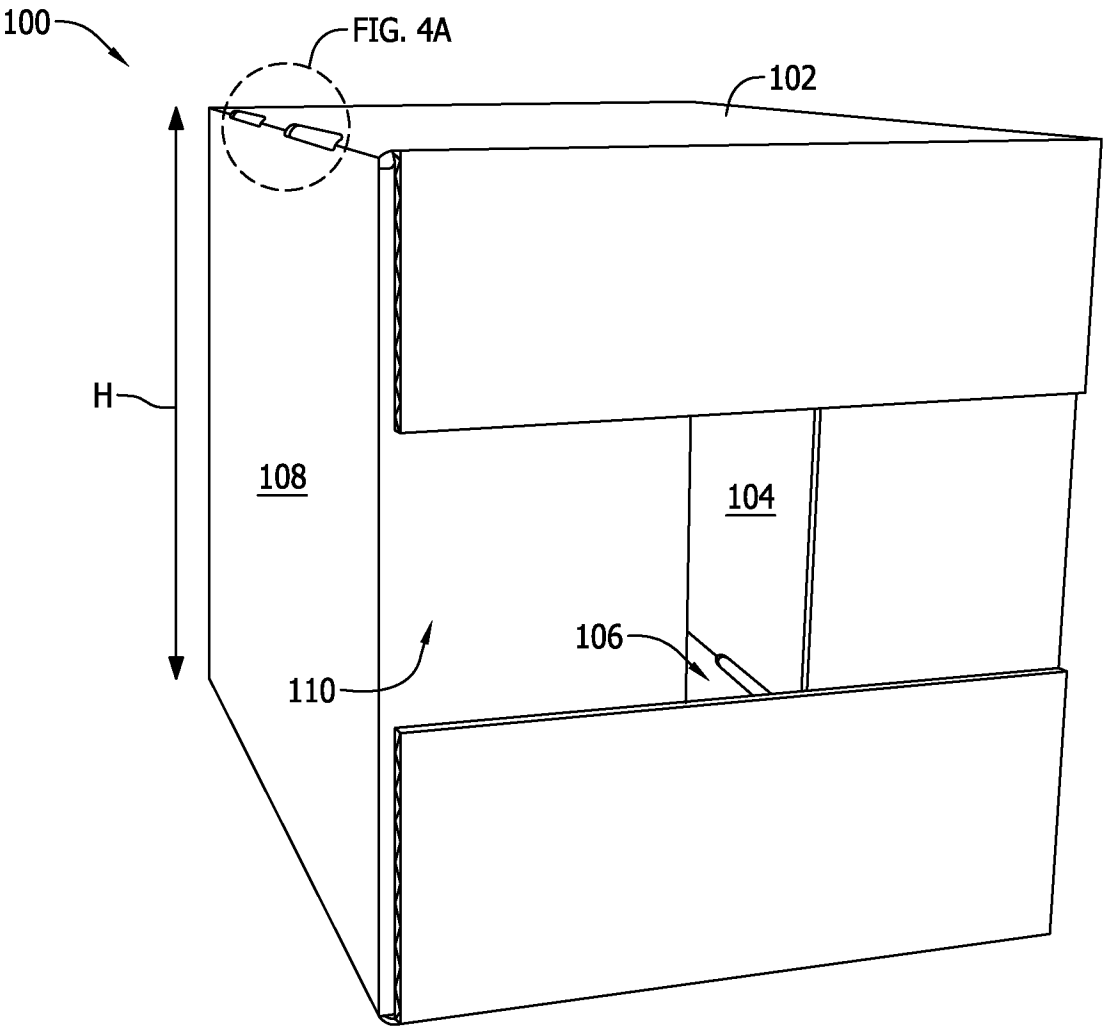
FIG. 3 is a perspective view of an example embodiment of a fully formed container, formed from the blank of FIG. 1.
Figure 4A:
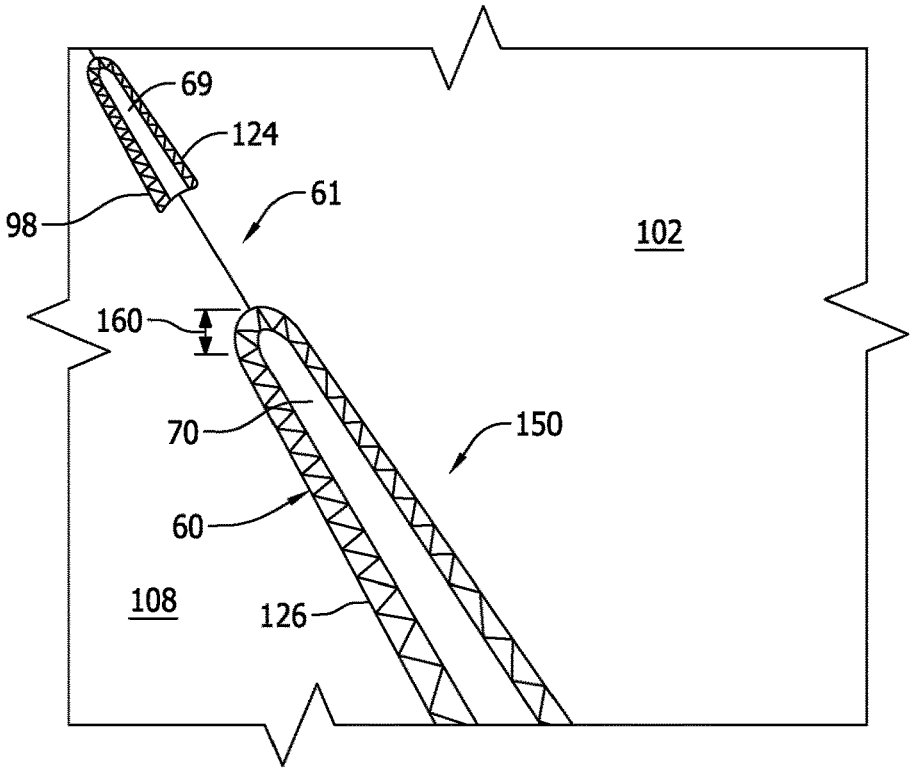
FIG. 4A is a first expanded view of the container shown in FIG. 3, illustrating a compression zone under no load.
Figure 4B:
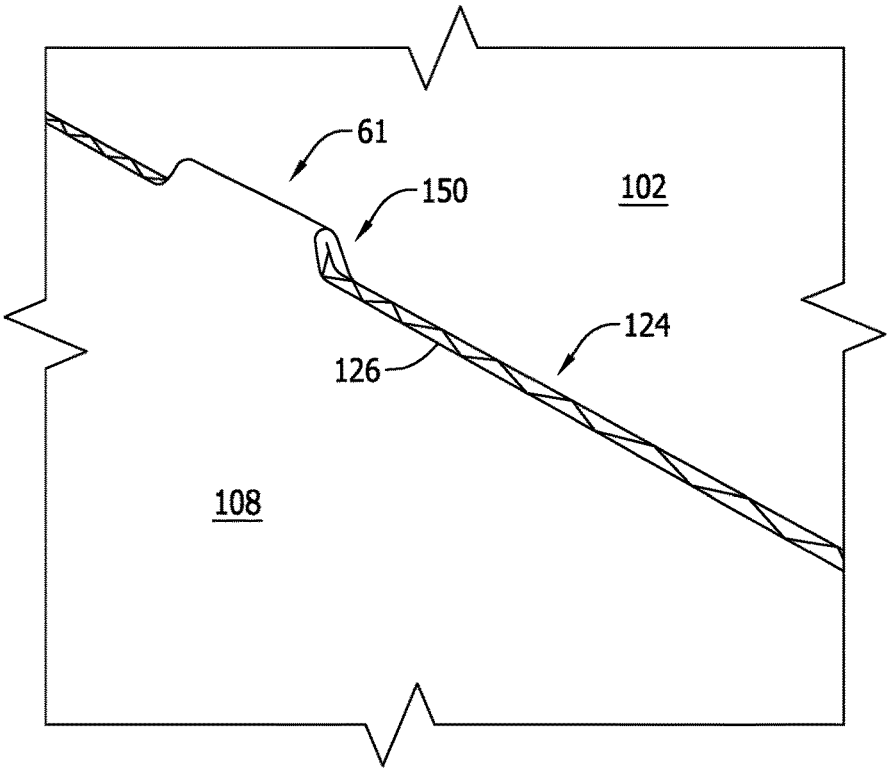
FIG. 4B is a second expanded view of the container shown in FIG. 3, illustrating the compression zone shown in FIG. 4A under a vertical load.

Referring now to the drawings, and more specifically to FIG. 1, a top plan view of a blank 10 of sheet material for forming a container is shown. FIG. 2 is a perspective view of a container 100 formed from blank 10, shown in a partially formed configuration. FIG. 3 is a perspective view of container 100 formed from blank 10, shown in a fully formed configuration. FIGS. 4A and 4B illustrate a compression zone 150 of container 100 under no load and vertical load conditions.

Blank 10 has a first or interior surface 12 and an opposing second or exterior surface 14. Further, blank 10 defines a leading edge 16 and an opposing trailing edge 18. In one embodiment, blank 10 includes, in series from leading edge 16 to trailing edge 18, a plurality of panels including a first side panel 20, a bottom panel 22, a second side panel 24, a top panel 26, and a glue flap 28, coupled together along preformed, generally parallel, fold lines 30, 32, 34, and 36, respectively. More specifically, first side panel 20 extends between leading edge 16 and fold line 30, bottom panel 22 extends from fold line 30, second side panel 24 extends from fold line 32, top panel 26 extends from fold line 34, and glue flap 28 extends between fold line 36 and trailing edge 18. In an alternative embodiment, glue flap 28 extends from first side panel 20 opposite bottom panel 22.

Fold lines 30, 32, 34, and 36, as well as other fold lines and/or hinge lines described herein, may include any suitable line of weakening and/or line of separation known to those skilled in the art and guided by the teachings herein provided.

In the example embodiment, first side panel 20 and second side panel 24 are substantially congruent and have a rectangular shape, and bottom panel 22 and top panel 26 are substantially congruent and have a rectangular shape. In alternate embodiments, panels 20, 22, 24, and 26 have any suitable shape that enables blank 10 to function as described herein. Moreover, first side panel 20 and second side panel 24 each have a width $W_1$, and bottom panel 22 and top panel 26 each have a width $W_2$ that is less than $W_1$. In alternative embodiments, $W_2$ is substantially equal to or greater than $W_1$.

In addition, blank 10 includes a plurality of end flaps extending from the plurality of panels. More specifically, a first major end flap 40 extends from a first end edge of first side panel 20 defined by a fold line 41, and a second major end flap 42 extends from a second end edge of first side panel 20 defined by fold line 43. A third major end flap 44 extends from a first end edge of second side panel 24 defined by a fold line 45, and a fourth major end flap 46 extends from a second end edge of second side panel 24 defined by a fold line 47. In the example embodiment, first major end flap 40, second major end flap 42, third major end flap 44, and fourth major end flap 46 are substantially congruent. In alternative embodiments, at least one of major end flap 40, 42, 44, and 46 is other than substantially congruent to at least one other of major end flaps 40, 42, 44, and 46.

A first minor end flap 50 extends from a first end edge of bottom panel 22 defined by a fold line 51, and a second minor end flap 52 extends from a second end edge of bottom panel 22 defined by a fold line 53. A third minor end flap 54 extends from a first end edge of top panel 26 defined by a fold line 55, and a fourth minor end flap 56 extends from a second end edge of top panel 26 defined by a fold line 57. In the example embodiment, first minor end flap 50, second minor end flap 52, third minor end flap 54, and fourth minor end flap 56 are substantially congruent. In alternative embodiments, at least one of minor end flap 50, 52, 54, and 56 is other than substantially congruent to at least one other of minor end flaps 50, 52, 54, and 56. In the example embodiment, fold lines 41, 43, 45, 47, 51, 53, 55, and 57 are generally parallel to each other and generally perpendicular to fold lines 30, 32, 34, and 36.

Blank 10 further includes a plurality of cutouts 60. In the example embodiment, each of cutouts 60 is defined along one of fold lines 30, 32, 34, and 36. More specifically, each of cutouts 60 extends symmetrically from one of fold lines 30, 32, 34, 36 into the adjacent ones of panels 20, 22, 24, 26, and 28. In the example embodiment, a pair of congruent cutouts 60 is disposed along each of fold lines 30, 32, 34, and 36. More particularly, two cutouts 65 and 66 are disposed along fold line 30 and extend into first side panel 20 and bottom panel 22, two cutouts 67 and 68 are disposed along fold line 32 and extend into bottom panel 22 and second side panel 24, two cutouts 69 and 70 are disposed along fold line 34 and extend into second side panel 24 and top panel 26, and two cutouts 71 and 72 are disposed along fold line 36 and extend into top panel 26 and glue flap 28. In an alternative embodiment in which glue flap 28 extends from first side panel 20, cutouts 71 and 72 are disposed along a fold line between glue flap 28 and first side panel 20 and extend into glue flap 28 and first side panel 20. It should be understood that any reference to cutouts 60 refers generally and collectively to cutouts 65, 66, 67, 68, 69, 70, 71, and 72. In the illustrated embodiment, cutouts 60 are arranged symmetrically about a longitudinal axis 64 of blank 10, thereby defining bridge portions 61 along fold lines 30, 32, 34, and 36. Accordingly, in the example embodiment, blank 10 includes eight cutouts 60 and twelve bridge portions 61, wherein two cutouts 60 and three bridge portions 61 are disposed along fold lines 30, 32, 34, and 36. In other embodiments, blank 10 includes additional, fewer, or differently arranged cutouts and/or no cutouts along one or more of fold lines 30, 32, 34, and/or 36. For example, in alternative embodiments, cutouts 60 are not arranged symmetrically about longitudinal axis 64.

In the example embodiment, each end flap 40, 42, 44, 46, 50, 52, 54, and 56 includes a pair of opposing side edges. More specifically, first major end flap 40 includes opposing side edges 73 and 74, second major end flap 42 includes opposing side edges 75 and 76, first minor end flap 50 includes opposing side edges 77 and 78, second minor end flap 52 includes opposing side edges 79 and 80, third major end flap 44 includes opposing side edges 81 and 82, fourth major end flap 46 includes opposing side edges 83 and 84, third minor end flap 54 includes opposing side edge 85 and 86, and fourth minor end flap 56 include opposing side edge 87 and 88. Adjacent side edges of end flaps 40, 42, 44, 46, 50, 52, 54, and 56 are spaced apart from one another by a distance d, which is measured between adjacent side edges. For example, side edge 76 of second major end flap 42 is spaced apart from side edge 79 of second minor end flap 52 by distance d.

In the illustrated embodiment, cutouts 60 have a width $W_3$ that is approximately equal to distance d, and defined parallel to a direction 62 of internal, corrugated flutes 98 (shown in FIG. 2) of blank 10. In alternative embodiments, width $W_3$ may be greater than or less than distance d. Additionally, in the example embodiment, a major dimension of each cutout 60, designated as length L, is oriented perpendicular to direction 62 of flutes 98. Moreover, in the illustrated embodiment, side edges of cutouts 60 that are defined in first side panel 20, second side panel 24, and/or glue flap 28 (in other words, those panels of blank 10 that are oriented vertically when container 100 is formed from blank 10) substantially align with side edges of respective ones of major end flaps 40, 42, 44, and 46. Specifically, a side edge 89 of cutout 65 and a side edge 90 of cutout 66 substantially align with side edge 74 of first major end flap 40 and side edge 76 of second major end flap 42, a side edge 91 of cutout 67 and a side edge 92 of cutout 68 substantially align with side edge 81 of third major end flap 44 and side edge 83 of fourth major end flap 46, and a side edge 93 of cutout 69 and a side edge 94 of cutout 70 substantially align with side edge 82 of third major end flap 44 and side edge 84 of fourth major end flap 46. When container 100 is formed from blank 10, a side edge 95 of cutout 71 and a side edge 96 of cutout 72 substantially align with side edge 73 of first major end flap 40 and side edge 75 of second major end flap 42.

A top edge of first side panel 20 is defined by leading edge 16. Cutouts 65 and 66 and fold line 30 collectively define a bottom edge 21 of first side panel 20 and a first side edge 23 of bottom panel 22. Cutouts 67 and 68 and fold line 32 collectively define a second side edge 25 of bottom panel 22 and a bottom edge 27 of second side panel 24. Cutouts 69 and 70 and fold line 34 collectively define a top edge 29 of second side panel 24 and a first side edge 31 of top panel 26. Cutouts 71 and 72 and fold line 36 collectively define a second side edge 33 of top panel 26 and a side edge 35 of glue flap 28. Trailing edge 18 defines a free edge of glue flap 28. Moreover, when container 100 is formed from blank 10, as shown in FIG. 2, top edge 29 of second side panel 24 and first side edge 31 of top panel 26 cooperate to define a first compression zone 150, second side edge 25 of bottom panel 22 and bottom edge 27 of second side panel 24 cooperate to define a second compression zone 152, bottom edge 21 of first side panel 20 and first side edge 23 of bottom panel 22 cooperate to define a third compression zone 154, and second side edge 33 of top panel 26 and side edge 35 of glue flap 28 cooperate to define a fourth compression zone 156, as will be described herein.

Container 100 includes a top wall 102, a first side wall 104, a bottom wall 106, a second side wall 108, a first end wall 110 (shown in FIG. 3), and a second end wall 112. In the example embodiment, each of side walls 104 and 108 is generally perpendicular to each of end walls 110 and 112, and each of side walls 104 and 108 and end walls 110 and 112 is generally perpendicular to bottom wall 106 and top wall 102, such that container 100 has a generally rectangular prismatic shape. Top wall 102, bottom wall 106, side walls 104 and 108, and end walls 110 and 112 cooperate to define cavity 120 of container 100.

In the example embodiment, top wall 102 includes top panel 26, first side wall 104 includes first side panel 20 and glue flap 28, bottom wall 106 includes bottom panel 22, and second side wall 108 includes second side panel 24. First end wall 110 includes first major end flap 40, third major end flap 44, first minor end flap 50, and third minor end flap 54. Second end wall includes second major end flap 42, fourth major end flap 46, second minor end flap 52, and fourth minor end flap 56. In an alternative embodiment in which glue flap 28 extends from first side panel 20, top wall 102 includes top panel 26 and glue flap 28, and first side wall includes first side panel 20.

Moreover, when container 100 is formed from blank 10, each of side walls 104 and 108 includes corrugated flutes 98 oriented in a vertical direction 122. Accordingly, side walls 104 and 108 have improved stacking strength as compared to, for example, a container having side walls with horizontally oriented flutes (i.e., flutes oriented perpendicular to direction 122). Additionally, when container 100 is formed from blank 10, each of major end flaps 40, 42, 44, and 46 includes corrugated flutes 98 oriented in vertical direction 122.

In the example embodiment, exterior surface 14 of each of first and third major end flaps 40 and 44 is coupled to interior surface 12 of first and third minor end flaps 50 and 54, and similarly, exterior surface 14 of each of second and fourth major end flaps 42 and 46 is coupled to interior surface of second and fourth minor end flaps 52 and 56, such that each of end walls 110 and 112 are configured with the improved stacking strength of major end flaps 40, 42, 44, and 46 due to vertical flutes 98 therein. More specifically, by arranging minor and major end flaps such that the minor end flaps are exterior of the major end flaps, with respect to cavity 120, top panel 26 of top wall 102 rests on (i.e., is disposed directly on top of) major end flaps 40, 42, 44, and 46. In alternative embodiments, at least one of end walls 110 and 112 includes an alternative arrangement of minor and major end flaps.

Container 100 further includes first compression zone 150 at an intersection of top wall 102 and second side wall 108, or more specifically, between a first side edge 124 of top wall 102 and a top edge 126 of second side wall 108. Container 100 includes second compression zone 152 at an intersection of second side wall 108 and bottom wall 106, between a bottom edge 128 of second side wall 108 and a first side edge 130 of bottom wall 106. Container 100 also includes third compression zone 154 at an intersection of bottom wall 106 and first side wall 104, between a second side edge 132 of bottom wall 106 and a bottom edge 134 of first side wall 104. Container 100 further includes fourth compression zone 156 at an intersection of first side wall 104 and top wall 102, between a top edge 136 of first side wall 104 and a second side edge 138 of top wall 102. Each compression zone 150, 152, 154, and 156 extends from first end wall 110 to second end wall 112.

Top wall 102 defines a plane that is separated by a compression depth 160 from top edges 126 and 136 of side walls 108 and 104, respectively, in first and fourth compression zones 150 and 156, when top wall 102 is not under a stacking load. For example, top wall 102 defines a plane that is compression depth 160 of approximately ½ d above top edges 126 and 136 of side walls 108 and 104, respectively, in first and fourth compression zones 150 and 156, under no vertical load. Similarly, bottom wall 106 defines a plane that is separated by compression depth 160 from bottom edges 128 and 136 of side walls 108 and 104, respectively, in second and third compression zones 152 and 154, when top wall 102 is not under the stacking load. Compression zones 150, 152, 154, and 156 are configured to facilitate slight compression or crushing of container 100 under a force exerted substantially vertically on container 100 (i.e., parallel to direction 122), such as under a stacking load exerted when multiple containers 100 including products in cavity 120 are stacked upon one another. The stacking load may include any load or exerted force that exceeds a threshold amount to initiate compression of compression zones 150, 152, 154, and/or 156. The stacking load may vary between containers of different dimensions and/or containers having different numbers and/or orientations of cutouts 60 and bridge portions 61.

As shown in FIG. 4A, under no stacking load, each bridge portion 61 extends through approximately a 90° angle, and bridge portions 61 are configured to maintain top wall 102 in a plane above side walls 104 and 108 by compression depth 160, and bottom wall 106 in a plane below side walls 104 and 108 by compression depth 160. When the force of a stacking load is placed on container 100, for example when a second container 100 containing product is stacked upon top wall 102, bridge portions 61 in first and fourth compression zones 150 and 156 allow top wall 102 to be displaced vertically downwards, or towards cavity 120, by an amount up to compression depth 160. In one embodiment, as shown in FIG. 4B, bridge portions 61 deform, enabling top wall 102 to shift into a position generally between side walls 104 and 108, such that at least a portion of first side edge 124 of top wall 102 is substantially co-planar with top edge 126 of second side wall 105, and at least a portion of second side edge 138 is substantially co-planar with top edge 136 of first side wall 104. In another embodiment (not shown), bridge portions 61 deform, with top wall 102 shifting into a position directly on top of side walls 104 and 108, such that interior surface of top wall 102 is positioned against top edges 126 and 136 of side walls 108 and 104, respectively.

Accordingly, in either embodiment, top edges 126 and 136 of side walls 104 and 108, respectively, are engaged in supporting the load, thereby engaging the stacking strength of side walls 104 and 108 to support the load on container 100. Bridge portions 61 in second and third compression zones 152 and 154 allow side walls 104 and 108 to be displaced downwards towards bottom wall 106 by compression depth 160. In one embodiment, bridge portions 61 deform, enabling side walls 104 and 108 to shift into position on either side of bottom wall 106, such that at least a portion of bottom edge 128 of second side wall 108 is substantially co-planar with first side edge 130 of bottom wall, and at least a portion of bottom edge 134 of first side wall 104 is substantially co-planar with second side edge 132 of bottom wall 106. In another embodiment, bridge portions 61 deform, with side walls 104 and 108 shifting into a position directly on top of bottom wall 106, such that interior surface of bottom wall 106 is positioned against bottom edges 128 and 134 of side walls 108 and 104, respectively.

In addition, in the example embodiment, as container 100 is vertically compressed (top wall 102 being displaced downwards, side walls 104 and 108 being displaced downwards), interior surface 12 of top wall 102 adjacent fold line 41 engages at least one of major end flaps 40 and 44, and/or interior surface 12 of top wall 102 adjacent fold line 43 engages at least one of major end flaps 42 and 46. Accordingly, at least one of major end flaps 40, 42, 44, and 46 is engaged to support the load on container 100. In the example embodiment, the alignment of side edges of major end flaps 40, 42, 44, 46 with side edges of cutouts 60, as described above with respect to FIG. 1, facilitates substantially simultaneous engagement of major end flaps 40, 42, 44, 46 and side walls 104 and 108 to support the load on container 100. In some embodiments, in which any product within container 100 is approximately the same height H as container 100, such vertical compression also facilitates engagement of any product within container 100 to support the load on container 100.

In containers without compression zones, the side walls are immediately engaged in supporting a full amount of any stacking load and, as such, are vulnerable to buckling or collapsing. By contrast, compression zones 150, 152, 154, and 156 in container 100 absorb an initial impact of a stacking load, such that side walls 104 and 108 and major end flaps 40, 42, 44, 46 of end walls 110 and 112 are not immediately engaged but rather are more incrementally engaged, which improves the integrity and viability of container 100 under heavier stacking loads. Moreover, container 100 is crush-tolerant under increased loads, by permitting initial compression in compression zones 150, 152, 154, and 156 to prevent side-wall buckling. Thus, container 100 exhibits improved stacking strength over other single-walled containers without requiring double- or triple-walled construction.

To form container 100 from blank 10, first side panel 20 is rotated inwardly about fold line 30 toward interior surface 12 of bottom panel 22, into a substantially perpendicular relationship with bottom panel 22. Second side panel 24 is rotated inwardly about fold line 32 into a substantially perpendicular relationship with bottom panel 22, and top panel 26 is rotated inwardly about fold line 34 into a substantially perpendicular relationship with second side panel 24. Glue flap 28 is coupled to first side panel 20, using, for example, adhesive, another suitable bonding material, fasteners, and/or any other suitable method for attaching panels. In the example embodiment, exterior surface 14 of glue flap 28 is coupled to interior surface 12 of first side panel 20. In an alternative embodiment, interior surface 12 of glue flap 28 is coupled to exterior surface 14 of first side panel 20.

In addition, each of end flaps 40, 42, 44, 46, 50, 52, 54, 56 is rotated inwardly into a substantially perpendicular relationship with the respective panel 20, 22, 24, 26 from which the end flap extends. First and third minor end flaps

50 and 54 are placed into face-to-face relationship with first and third major end flaps 40 and 44, and second and fourth minor end flaps 52 and 56 are placed into face-to-face relationship with second and fourth major end flaps 42 and 46. First and third minor end flaps 50 and 54 are then coupled to first and third major end flaps 40 and 44 as described above, and second and fourth minor end flaps 52 and 56 are coupled to second and fourth major end flaps 42 and 46 as described above, using, for example, adhesive, another suitable bonding material, fasteners, and/or any other suitable method for attaching panels.

Figure 5:
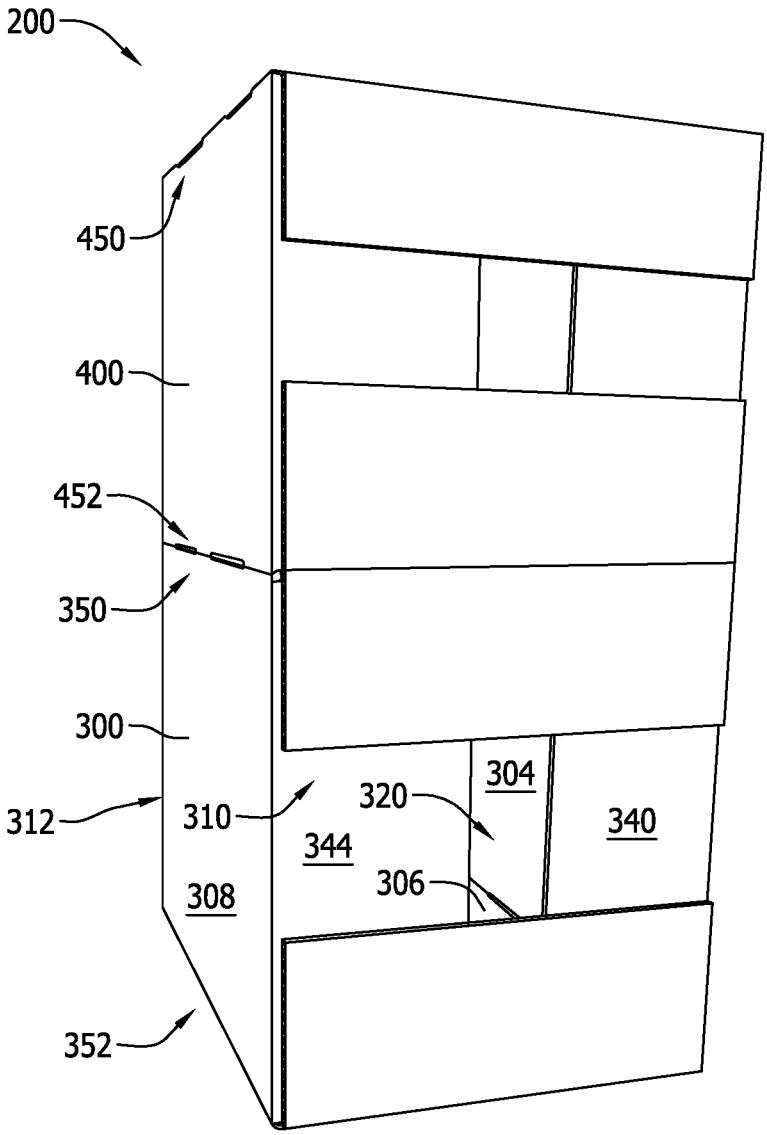
FIG. 5 is a perspective view of a stacked assembly of containers as shown in FIG. 3.

FIG. 5 is a perspective view of an assembly 200 of stacked containers 300, 400. First container 300 and second container 400 are similar to container 100, as shown and described with respect to FIGS. 2, 3, 4A, and 4B. Accordingly, where similar or substantially equivalent features are shown in FIG. 5 as in any of the preceding Figures, the same reference numerals are employed. As shown, when a vertical load (i.e., a weight of second container 400 containing product, not shown, therein) is exerted on first container 300, first container 300 is compressed. More specifically, as illustrated, a first compression zone 350 and a second compression zone 352 of first container 300 compress by compression depth 160 (shown in FIGS. 2 and 4A). Although not shown, it should be understood that a third and fourth compression zone of first container 300 also compress. A top wall (not shown in the view of FIG. 5) of first container 300 is displaced by compression depth 160 into a cavity 320 of first container 320. First and second side walls 304 and 308 of first container 300, as well as at least one of major end flaps (e.g., end flaps 340 and 344) of end walls 310 and/or 312 of first container 300, are engaged to support the load of second container 400 thereon. Accordingly, first and second side walls 304 and 308 may be displaced downwardly by compression depth 160. Conversely, first and second compression zones 450, 452 of second container 400 are not compressed, as no vertical load is exerted on second container 400.

Figure 6:
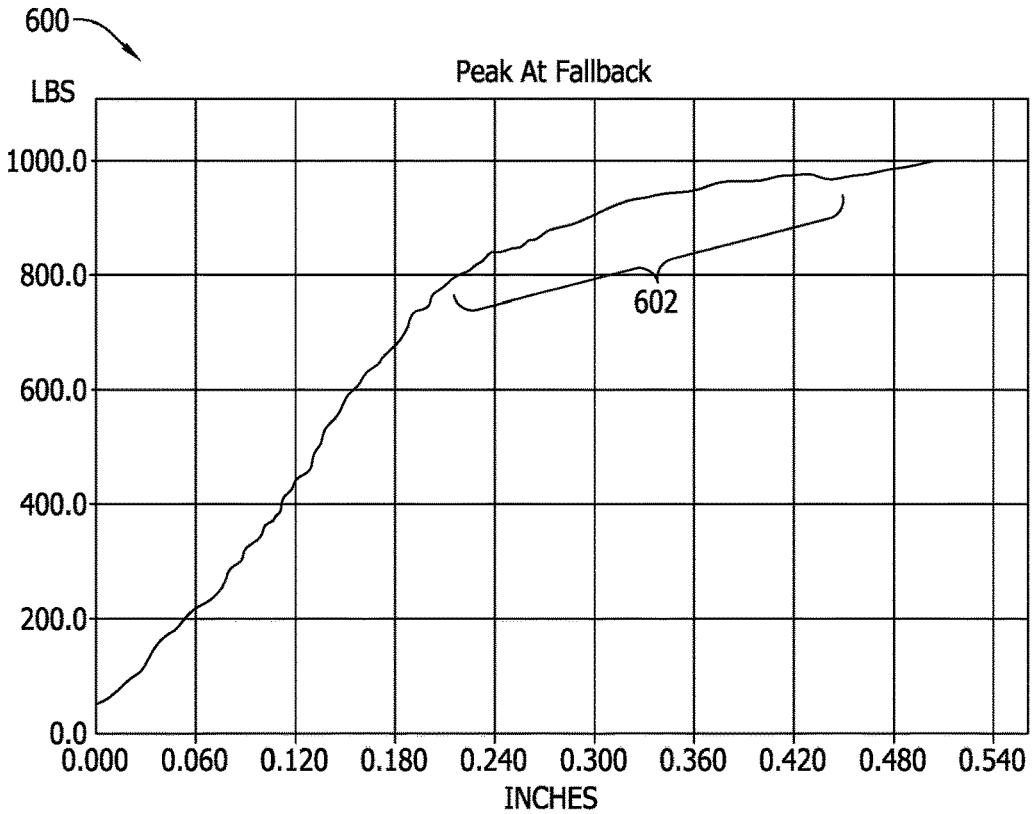
FIG. 6 depicts a plot of load vs. compression for a non-crush-tolerant container.
Figure 7:
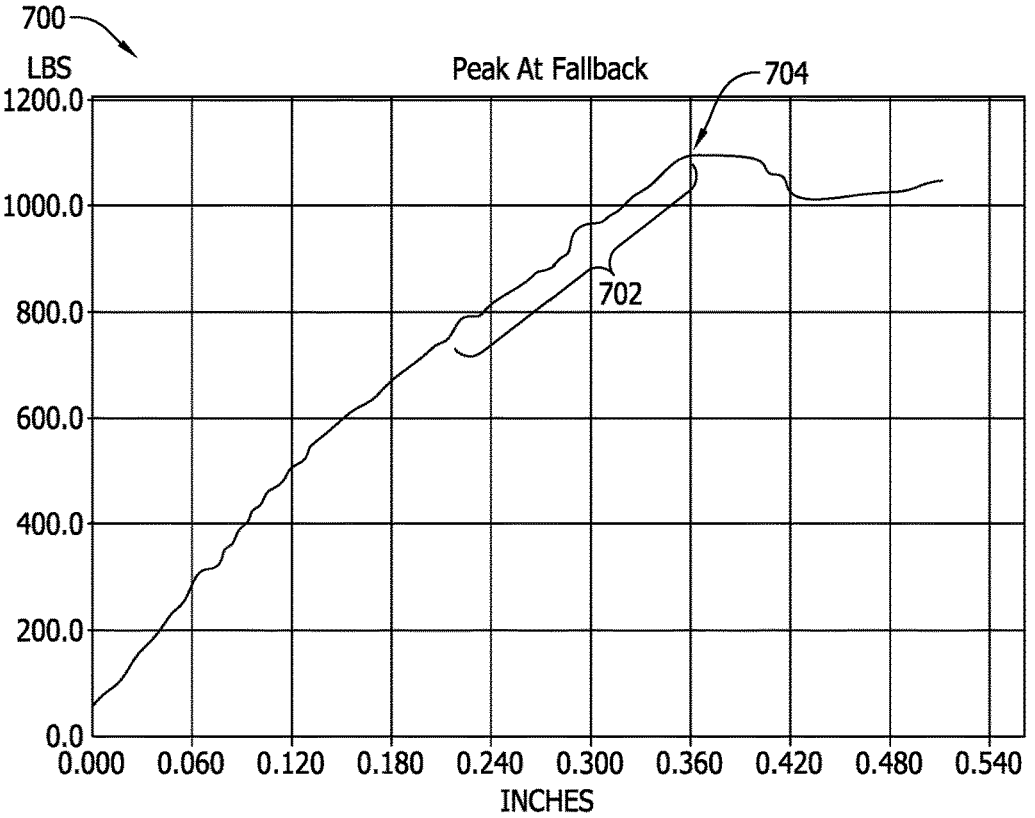
FIG. 7 depicts a plot of load vs. compression for the crush-tolerant container shown in FIGS. 2, 3, and 5.

FIGS. 6 and 7 depict two example graphs to illustrate performance of container 100 (as shown in FIGS. 2, 3, and 5) under a stacking load. More specifically, FIG. 6 depicts a plot 600 of load vs. compression depth for a non-crush-tolerant container (not shown). A peak stacking load of about 1000 lbs. is exerted on the non-crush-tolerant container before compression of the container by about 0.51 inches. Moreover, the non-crush tolerant-container exhibits non-linear compression 602 under loads greater than about 800 lbs. By contrast, FIG. 7 depicts a plot 700 of load vs. compression depth for crush-tolerant container 100. Crush-tolerant container 100 exhibits substantially linear compression 702 due to the gradual engagement of side walls 104 and 108 and/or major end flaps 40, 42, 44, and/or 46 to support container 100. Effectively, the load on container 100 is reduced, which enables container 100 to withstand greater load amount (e.g., up to about 1050-1100 lbs., in this example) before being fully engaged and/or compressed. At 704, a stacking load of about 1100 lbs. is exerted on container 100, causing compression of about 0.36 inches, at which point compression zones 150, 152, 154, and/or 156 are substantially fully compressed.

Exemplary embodiments of blanks, containers, and methods, are described and/or illustrated herein in detail. The blanks, containers, and methods are not limited to the specific embodiments described herein, but rather, elements of each blank and container and steps of each method may be utilized independently and separately from other elements and steps described herein. Each blank and container element and each method step can also be used in combination with other blank and container elements and/or method steps.

When introducing elements, components, etc. of the methods and assemblies described and/or illustrated herein, the articles "a", "an", "the" and "said" are intended to mean that there are one or more of the element(s), component(s), etc. The terms "comprising", "including" and "having" are intended to be inclusive and mean that there may be additional element(s), component(s), etc. other than the listed element(s), component(s), etc.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A blank for constructing a crush-tolerant container, the blank comprising:

a plurality of panels coupled together in series along substantially parallel fold lines, the plurality of panels including a first side panel, a bottom panel, a second side panel, [and] a top panel, *and a glue flap extending from the top panel*; and at least one cutout and at least one bridge portion positioned along a first fold line between the top panel and [the first side panel] *the glue flap*, wherein the at least one bridge portion is configured to maintain the top panel in a plane spaced above a top edge of the first side panel when the container is formed and the top panel is not under a stacking load, and wherein the at least one bridge portion and the at least one cutout are configured to allow the top panel to move downwardly such that at least a portion of the top panel is substantially co-planar with the top edge of the first side panel when the container is formed and the top panel is under the stacking load; wherein the blank further comprises a plurality of end flaps, the plurality of end flaps including:

a first major end flap extending from a first end edge of the first side panel; and a first minor flap extending from an end edge of the top panel;

wherein the first minor flap and the first major end flap are configured to be in face-to-face relationship with one another in a set-up container;

wherein the at least one cutout includes a first side edge disposed in the [first side panel] *glue flap* and offset a distance from the first fold line, wherein the first major end flap includes a first side edge, and wherein the first side edge of the at least one cutout is *configured to be* substantially aligned with the first side edge of the first major end flap *in a set-up container*.

2. The blank of claim 1, wherein the blank is formed from so corrugated cardboard including a plurality of flutes, and wherein the plurality of flutes are oriented parallel to a transverse axis of the blank such that the plurality of flutes on the first and second side panels are oriented vertically when the container is formed.

3. The blank of claim 2, wherein a major dimension of the at least one cutout is defined perpendicular to the plurality of flutes.

4. The blank of claim 1, wherein the at least one cutout is defined symmetrically about the first fold line.

5. The blank of claim 1, wherein the first major end flap includes internal flutes that are oriented vertically when the container is formed, and wherein the top panel is configured to engage the first major end flap to support the stacking load when the container is formed and the top panel is under the stacking load.

[6. The blank of claim 1, wherein the plurality of panels further includes a glue flap extending from the top panel.]

[7. The blank of claim 1, wherein the plurality of panels further includes a glue flap extending from the first side panel.]

8. A crush-tolerant container formed from a blank, the container comprising:

a top wall and an opposing bottom wall;

two opposing side walls, wherein the top wall, the two side walls, and the bottom wall define a cavity;

and a first compression zone defined between the top wall and a first side wall of the two side walls, the first compression zone including a first cutout and at least a first bridge portion positioned along a first fold line between the top *wall* and [the first side wall] *a glue flap*, wherein the first compression zone maintains the top wall in a first plane separated from a top edge of the first side wall by a compression depth when the top wall is not under a stacking load, and wherein the first compression zone is configured to enable displacement of the top wall toward the cavity by the compression depth when the top wall is under the stacking load;

further comprising two opposing end walls, wherein a first end wall of the two end walls includes a first major end flap that emanates from a first end edge of the first side wall, wherein the first major end flap includes internal flutes oriented vertically with respect to the bottom wall, and wherein upon displacement of the top wall by the compression depth, the top wall engages the first major end flap to support the stacking load;

wherein the first end wall further includes a first minor end flap that emanates from an end edge of the top wall, the first major end flap and the first minor end flap being secured to one another in a face-to-face relationship;

wherein the first cutout includes a first side edge disposed in the [first side wall] *glue flap* and offset a distance from the first fold line, and the first major end flap includes a first side edge substantially aligned with the first side edge of the first cutout, and wherein upon displacement of the top wall by the compression depth, the top wall engages the first side wall and the first major end flap substantially simultaneously.

9. The container of claim 8, wherein upon displacement of the top wall by the compression depth, the top wall engages the first side wall to support the stacking load.

10. The container of claim 8, wherein the first bridge portion deforms to enable displacement of the top wall toward the cavity by the compression depth.

11. The container of claim 8, further comprising a second compression zone defined between the first side wall and the bottom wall, the second compression zone including a second cutout and a second bridge portion, wherein the second compression zone maintains the bottom wall in a second plane separated from a bottom edge of the first side wall by the compression depth when the top wall is not under the stacking load, and wherein the second compression zone is configured to enable displacement of the first side wall towards the bottom wall by the compression depth when the top wall is under the stacking load.

12. The container of claim 8, wherein the two side walls include internal flutes oriented vertically with respect to the bottom wall.

13. A method for forming a crush-tolerant container from a blank, the blank including a plurality of panels coupled together in a series along substantially parallel fold lines, the plurality of panels including a top panel, a first side panel, a bottom panel, a second side panel, and a glue flap, the blank also including at least one cutout and at least one bridge portion positioned along a first fold line between the top panel and the [first side panel] *glue flap*, the method comprising:

rotating the plurality of panels about the plurality of fold lines to form a plurality of walls of the container, such that the plurality of walls define a cavity, [and such that the at least one bridge portion extends between a first side wall and a top wall of the plurality of walls]; and securing the glue flap to the top panel *such that the at least one bridge portion extends between a top wall of the plurality of walls and the glue flap*, wherein the at least one bridge portion maintains the top wall in a plane spaced above a top edge of the first side wall by a compression depth when the top wall is not under a stacking load, and the at least one bridge portion and the at least one cutout are configured to allow the top panel to move downwardly such that at least a portion of the top panel is substantially co-planar with the top edge of the first side panel when the top wall is under the stacking load;

wherein the blank further includes a first minor end flap extending from an end edge of the top panel and a first major end flap extending from an end edge of the first side panel, the method further comprising: rotating the first major end flap inwards towards the cavity, wherein the first major end flap includes internal flutes oriented vertically after said rotating, and wherein the top wall is configured to engage the first major end flap to support the stacking load when the top wall is under the stacking load;

rotating the first minor end flap inwards towards the cavity and into a face-to-face relationship with the first major end flap; and securing the first minor end flap to the first major end flap, wherein the at least one cutout includes a first side edge disposed in the [first side panel] *glue flap* and offset a distance from the first fold line, and the first major end flap includes a first side edge substantially aligned with the first side edge of the at least one cutout.

14. An assembly of stacked crush-tolerant containers comprising:

a first crush-tolerant container comprising:

a top wall and an opposing bottom wall;

two opposing side walls, wherein the top wall, the two side walls, and the bottom wall define a cavity; and a first compression zone defined between the top wall and a first side wall of the two side walls, the first compression zone including a [first] cutout and [at least a first] *a* bridge portion positioned along a first fold line between the top wall and [the first side wall] *the glue flap*; and a second crush-tolerant container stacked vertically on top of the first container, wherein, under a load of the second container, the first compression zone of the first container enables displacement of the top wall toward the cavity of the first container by a compression depth;

wherein the first container further comprises*:* two opposing end walls, a first end wall of the two end walls including a first major end flap that emanates from a first end edge of the first side wall, the first end wall further including a first minor end flap that emanates from an end edge of the top wall, the first major end flap and the first minor end flap being secured to one another in a face-to-face relationship, wherein the first major end flap includes a first side edge and the [first] cutout of the first container includes a first side edge disposed in [the first side wall] *the glue flap* and offset a distance from the first fold line, wherein the first side edge of the [first] cutout is substantially aligned with the first side edge of the first major end flap, and wherein upon displacement of the top wall by the compression depth, the top wall engages the first side wall and the first major end flap substantially simultaneously to support the load of the second container.

15. The assembly of stacked crush-tolerant containers of claim 14, wherein upon displacement of the top wall of the first container by the compression depth, the top wall of the first container engages the first side wall of the first container to support the load of the second container.

16. The assembly of stacked crush-tolerant containers of claim 14, wherein the first container further comprises a second compression zone defined between the first side wall and the bottom wall, the second compression zone including a second cutout and a second bridge portion, wherein, under the load of the second container, the second compression zone is configured to enable displacement of the first side wall towards the bottom wall by the compression depth when the top wall is under the stacking load.

*17. A blank for constructing a crush-tolerant container, the blank comprising:*

*a plurality of panels coupled together in series along substantially parallel fold lines, the plurality of panels including a first side panel, a bottom panel, a second side panel, and a top panel; and*

*at least one cutout and at least one bridge portion positioned along a first fold line between the bottom panel and the first side panel,*

*wherein the at least one bridge portion is configured to maintain the first side panel in a plane spaced above a bottom edge of the bottom panel when the container is formed and the top panel is not under a stacking load, and*

*wherein the at least one bridge portion and the at least one cutout are configured to allow the first side panel to move downwardly such that at least a portion of the first side panel is substantially co-planar with the bottom edge of the bottom panel when the container is formed and the top panel and first side panel are under the stacking load; wherein the blank further comprises a plurality of end flaps, the plurality of end flaps including:*

*a first major end flap extending from a first end edge of the first side panel; and*

*a first minor flap extending from an end edge of the bottom panel;*

*wherein the first minor flap and the first major end flap are configured to be in face-to-face relationship with one another in a set-up container;*

*wherein the at least one cutout includes a first side edge disposed in the first side panel and offset a distance from the first fold line, wherein the first major end flap includes a first side edge, and wherein the first side edge of the at least one cutout is configured to be substantially aligned with the first side edge of the first major end flap in a set-up container.*

*18. The blank of claim 17, wherein the blank is formed from corrugated cardboard including a plurality of flutes, and wherein the plurality of flutes are oriented parallel to a transverse axis of the blank such that the plurality of flutes on the first and second side panels are oriented vertically when the container is formed.*

*19. The blank of claim 18, wherein a major dimension of the at least one cutout is defined perpendicular to the plurality of flutes.*

*20. The blank of claim 17, wherein the at least one cutout is defined symmetrically about the first fold line.*

*21. The blank of claim 17, wherein the first major end flap includes internal flutes that are oriented vertically when the container is formed, and wherein the top panel is configured to engage the first major end flap to support the stacking load when the container is formed and the top panel is under the stacking load.*

*22. The blank of claim 17, wherein the plurality of panels further includes a glue flap extending from the top panel.*

*23. The blank of claim 17, wherein the plurality of panels further includes a glue flap extending from the first side panel.*

*24. A crush-tolerant container formed from a blank, the container comprising:*

*a top wall and an opposing bottom wall;*

*two opposing side walls, wherein the top wall, the two side walls, and the bottom wall define a cavity;*

*and a first compression zone defined between the bottom wall and a first side wall of the two side walls, the first compression zone including a first cutout and at least a first bridge portion positioned along a first fold line between the bottom wall and the first side wall,*

*wherein the first compression zone maintains the first side wall in a first plane separated from a bottom edge of the bottom wall by a compression depth when the top wall is not under a stacking load, and wherein the first compression zone is configured to enable displacement of the top wall toward the cavity and the first side wall toward the bottom wall by the compression depth when the top wall and first side wall are under the stacking load;*

*further comprising two opposing end walls, wherein a first end wall of the two end walls includes a first major end flap that emanates from a first end edge of the first side wall, wherein the first major end flap includes internal flutes oriented vertically with respect to the bottom wall, and wherein upon displacement of the top wall by the compression depth, the top wall engages the first major end flap to support the stacking load;*

*wherein the first end wall further includes a first minor end flap that emanates from an end edge of the bottom*

*wall, the first major end flap and the first minor end flap being secured to one another in a face-to-face relationship;*

*wherein the first cutout includes a first side edge disposed in the first side wall and offset a distance from the first fold line, and the first major end flap includes a first side edge substantially aligned with the first side edge of the first cutout, and wherein upon displacement of the top wall and the first side wall by the compression depth, the bottom wall engages the first side wall and the first major end flap substantially simultaneously.*

*25. The container of claim 24, wherein upon displacement of the top wall by the compression depth, the top wall engages the first side wall to support the stacking load.*

*26. The container of claim 24, wherein the first bridge portion deforms to enable displacement of the top wall toward the cavity by the compression depth.*

*27. The container of claim 24, further comprising a second compression zone defined between the first side wall and the top wall, the second compression zone including a second cutout and a second bridge portion, wherein the second compression zone maintains the top wall in a second plane separated from a top edge of the first side wall by the compression depth when the top wall is not under the stacking load, and wherein the second compression zone is configured to enable displacement of the top wall towards the first side wall by the compression depth when the top wall is under the stacking load.*

*28. The container of claim 24, wherein the two side walls include internal flutes oriented vertically with respect to the bottom wall.*

*29. A method for forming a crush-tolerant container from a blank,*

*the blank including a plurality of panels coupled together in a series along substantially parallel fold lines, the plurality of panels including a top panel, a first side panel, a bottom panel, a second side panel, and a glue flap,*

*the blank also including at least one cutout and at least one bridge portion positioned along a first fold line between the bottom panel and the first side panel,*

*the method comprising:*

*rotating the plurality of panels about the plurality of fold lines to form a plurality of walls of the container, such that the plurality of walls define a cavity; and*

*securing the glue flap to the top panel such that the at least one bridge portion extends between a bottom wall and a first side wall of the plurality of walls, wherein the at least one bridge portion maintains the first side wall in a plane spaced above a bottom edge of the bottom wall by a compression depth when the top wall and first side wall are not under a stacking load, and the at least one bridge portion and the at least one cutout are configured to allow the first side panel to move downwardly such that at least a portion of the bottom panel is substantially co-planar with the bottom edge of the first side panel when the top wall and first side wall are under the stacking load;*

*wherein the blank further includes a first minor end flap extending from an end edge of the top panel and a first major end flap extending from an end edge of the first side panel,*

*the method further comprising: rotating the first major end flap inwards towards the cavity, wherein the first major end flap includes internal flutes oriented vertically after said rotating, and wherein the bottom wall is configured to engage the first major end flap to support the stacking load when the top wall is under the stacking load;*

*rotating the first minor end flap inwards towards the cavity and into a face-to-face relationship with the first major end flap; and*

*securing the first minor end flap to the first major end flap, wherein the at least one cutout includes a first side edge disposed in the first side panel and offset a distance from the first fold line, and the first major end flap includes a first side edge substantially aligned with the first side edge of the at least one cutout.*

*30. An assembly of stacked crush-tolerant containers comprising:*

*a first crush-tolerant container comprising:*

*a top wall and an opposing bottom wall;*

*two opposing side walls, wherein the top wall, the two side walls, and the bottom wall define a cavity; and*

*a first compression zone defined between the top wall and a first side wall of the two side walls, the first compression zone including a cutout and a bridge portion positioned along a first fold line between the bottom wall and the first side wall; and*

*a second crush-tolerant container stacked vertically on top of the first container, wherein, under a load of the second container, the first compression zone of the first container enables displacement of the top wall toward the cavity of the first container by a compression depth;*

*wherein the first container further comprises:*

*two opposing end walls,*

*a first end wall of the two end walls including a first major end flap that emanates from a first end edge of the first side wall, the first end wall further including a first minor end flap that emanates from an end edge of the top wall, the first major end flap and the first minor end flap being secured to one another in a face-to-face relationship,*

*wherein the first major end flap includes a first side edge and the cutout of the first container includes a first side edge disposed in the first side wall and offset a distance from the first fold line,*

*wherein the first side edge of the cutout is substantially aligned with the first side edge of the first major end flap, and wherein upon displacement of the top wall by the compression depth, the bottom wall engages the first side wall and the first major end flap substantially simultaneously to support the load of the second container.*

*31. The assembly of stacked crush-tolerant containers of claim 30, wherein upon displacement of the top wall and the first side wall of the first container by the compression depth, the first side wall of the first container engages the bottom wall of the first container to support the load of the second container.*

*32. The assembly of stacked crush-tolerant containers of claim 30, wherein the first container further comprises a second compression zone defined between the first side wall and the top wall, the second compression zone including a second cutout and a second bridge portion, wherein, under the load of the second container, the second compression zone is configured to enable displacement of the top wall towards the first side wall by the compression depth when the top wall is under the stacking load.*

*33. A blank for constructing a crush-tolerant container, the blank comprising:*

*a plurality of panels coupled together in series along substantially parallel fold lines, the plurality of panels including a first side panel, a bottom panel, a second side panel, and a top panel; and*

*at least one cutout and at least one bridge portion positioned along a first fold line between the top panel and the second side panel,*

*wherein the at least one bridge portion is configured to maintain the top panel in a plane spaced above a top edge of the second side panel when the container is formed and the top panel is not under a stacking load, and*

*wherein the at least one bridge portion and the at least one cutout are configured to allow the top panel to move downwardly such that at least a portion of the top panel is substantially co-planar with the top edge of the second side panel when the container is formed and the top panel is under the stacking load; wherein the blank further comprises a plurality of end flaps, the plurality of end flaps including:*

*a first major end flap extending from a first end edge of the second side panel; and*

*a first minor flap extending from an end edge of the top panel;*

*wherein the first minor flap and the first major end flap are configured to be in face-to-face relationship with one another in a set-up container;*

*wherein the at least one cutout includes a first side edge disposed in the second side panel and offset a distance from the first fold line, wherein the first major end flap includes a first side edge, and wherein the first side edge of the at least one cutout is configured to be substantially aligned with the first side edge of the first major end flap in a set-up container.*

*34. The blank of claim 33, wherein the blank is formed from corrugated cardboard including a plurality of flutes, and wherein the plurality of flutes are oriented parallel to a transverse axis of the blank such that the plurality of flutes on the first and second side panels are oriented vertically when the container is formed.*

*35. The blank of claim 34, wherein a major dimension of the at least one cutout is defined perpendicular to the plurality of flutes.*

*36. The blank of claim 34, wherein the at least one cutout is defined symmetrically about the first fold line.*

*37. The blank of claim 34, wherein the first major end flap includes internal flutes that are oriented vertically when the container is formed, and wherein the top panel is configured to engage the first major end flap to support the stacking load when the container is formed and the top panel is under the stacking load.*

*38. The blank of claim 34, wherein the plurality of panels further includes a glue flap extending from the top panel.*

*39. The blank of claim 34, wherein the plurality of panels further includes a glue flap extending from the first side panel.*

*40. A crush-tolerant container formed from a blank, the container comprising:*

*a top wall and an opposing bottom wall;*

*two opposing side walls, wherein the top wall, the two side walls, and the bottom wall define a cavity; and*

*a first compression zone defined between the top wall and a second side wall of the two side walls, the first compression zone including a first cutout and at least a first bridge portion positioned along a first fold line between the top and the second side wall,*

*wherein the first compression zone maintains the top wall in a first plane separated from a top edge of the second side wall by a compression depth when the top wall is not under a stacking load, and wherein the first compression zone is configured to enable displacement of the top wall toward the cavity by the compression depth when the top wall is under the stacking load;*

*further comprising two opposing end walls, wherein a first end wall of the two end walls includes a first major end flap that emanates from a first end edge of the second side wall, wherein the first major end flap includes internal flutes oriented vertically with respect to the bottom wall, and wherein upon displacement of the top wall by the compression depth, the top wall engages the first major end flap to support the stacking load;*

*wherein the first end wall further includes a first minor end flap that emanates from an end edge of the top wall, the first major end flap and the first minor end flap being secured to one another in a face-to-face relationship;*

*wherein the first cutout includes a first side edge disposed in the second side wall and offset a distance from the first fold line, and the first major end flap includes a first side edge substantially aligned with the first side edge of the first cutout, and wherein upon displacement of the top wall by the compression depth, the top wall engages the second side wall and the first major end flap substantially simultaneously.*

*41. The container of claim 40, wherein upon displacement of the top wall by the compression depth, the top wall engages the second side wall to support the stacking load.*

*42. The container of claim 40, wherein the first bridge portion deforms to enable displacement of the top wall toward the cavity by the compression depth.*

*43. The container of claim 40, further comprising a second compression zone defined between the second side wall and the bottom wall, the second compression zone including a second cutout and a second bridge portion, wherein the second compression zone maintains the bottom wall in a second plane separated from a bottom edge of the second side wall by the compression depth when the top wall is not under the stacking load, and wherein the second compression zone is configured to enable displacement of the second side wall towards the bottom wall by the compression depth when the top wall is under the stacking load.*

*44. The container of claim 40, wherein the two side walls include internal flutes oriented vertically with respect to the bottom wall.*

*45. A method for forming a crush-tolerant container from a blank,*

*the blank including a plurality of panels coupled together in a series along substantially parallel fold lines, the plurality of panels including a top panel, a first side panel, a bottom panel, a second side panel, and a glue flap,*

*the blank also including at least one cutout and at least one bridge portion positioned along a first fold line between the top panel and the second side panel,*

*the method comprising:*

*rotating the plurality of panels about the plurality of fold lines to form a plurality of walls of the container, such that the plurality of walls define a cavity, and such that the at least one bridge portion extends between a second side wall and a top wall of the plurality of walls; and*

*securing the glue flap to the top panel, wherein the at least one bridge portion maintains the top wall in a plane spaced above a top edge of the second side wall by a compression depth when the top wall is not under a stacking load, and the at least one bridge portion and the at least one cutout are configured to allow the top panel to move downwardly such that at least a portion of the top panel is substantially co-planar with the top edge of the second side panel when the top wall is under the stacking load;*

*wherein the blank further includes a first minor end flap extending from an end edge of the top panel and a first major end flap extending from an end edge of the second side panel,*

*the method further comprising: rotating the first major end flap inwards towards the cavity, wherein the first major end flap includes internal flutes oriented vertically after said rotating, and wherein the top wall is configured to engage the first major end flap to support the stacking load when the top wall is under the stacking load;*

*rotating the first minor end flap inwards towards the cavity and into a face-to-face relationship with the first major end flap; and*

*securing the first minor end flap to the first major end flap; wherein the at least one cutout includes a first side edge disposed in the second side panel and offset a distance from the first fold line, and the first major end flap includes a first side edge substantially aligned with the first side edge of the at least one cutout.*

*46. An assembly of stacked crush-tolerant containers comprising:*

*a first crush-tolerant container comprising:*

*a top wall and an opposing bottom wall; two opposing side walls, wherein the top wall, the two side walls, and the bottom wall define a cavity; and a*

*first compression zone defined between the top wall and a second side wall of the two side walls, the first compression zone including a first cutout and at least a first bridge portion positioned along a first fold line between the top wall and the second side wall; and*

*a second crush-tolerant container stacked vertically on top of the first container, wherein, under a load of the second container, the first compression zone of the first container enables displacement of the top wall toward the cavity of the first container by a compression depth;*

*wherein the first container further comprises:*

*two opposing end walls,*

*a first end wall of the two end walls including a first major end flap that emanates from a first end edge of the second side wall, the first end wall further including a first minor end flap that emanates from an end edge of the top wall, the first major end flap and the first minor end flap being secured to one another in a face-to-face relationship,*

*wherein the first major end flap includes a first side edge and the first cutout of the first container includes a first side edge disposed in the second side wall and offset a distance from the first fold line,*

*wherein the first side edge of the first cutout is substantially aligned with the first side edge of the first major end flap, and wherein upon displacement of the top wall by the compression depth, the top wall engages the second side wall and the first major end flap substantially simultaneously to support the load of the second container.*

*47. The assembly of stacked crush-tolerant containers of claim 46, wherein upon displacement of the top wall of the first container by the compression depth, the top wall of the first container engages the second side wall of the first container to support the load of the second container.*

*48. The assembly of stacked crush-tolerant containers of claim 46, wherein the first container further comprises a second compression zone defined between the second side wall and the bottom wall, the second compression zone including a second cutout and a second bridge portion, wherein, under the load of the second container, the second compression zone is configured to enable displacement of the second side wall towards the bottom wall by the compression depth when the top wall is under the stacking load.*

* * * * *